United States Patent [19]

Klug et al.

[11] Patent Number: 4,702,878
[45] Date of Patent: Oct. 27, 1987

[54] SEARCH AND RETRIEVAL DEVICE

[75] Inventors: Ralph W. Klug, Oakmont; Charles E. Toler, Penn Hills; John A. Rylatt, Monroeville, all of Pa.

[73] Assignee: Westinghouse Electric Corp., Pittsburgh, Pa.

[21] Appl. No.: 819,087

[22] Filed: Jan. 15, 1986

[51] Int. Cl.$^4$ ............................................. G21C 17/00
[52] U.S. Cl. ...................... 376/249; 376/245; 376/248; 376/260; 165/11.2
[58] Field of Search ............... 376/260, 261, 245, 248, 376/249, 251; 165/11.2, 11 A; 294/19.1, 100, 906; 73/621, 622, 623

[56] References Cited

U.S. PATENT DOCUMENTS

| 2,947,564 | 8/1960 | Winther | 294/100 |
|---|---|---|---|
| 3,066,969 | 12/1962 | Camac | 294/66.2 |
| 3,077,361 | 2/1963 | Tait et al. | 376/249 |
| 3,745,637 | 7/1973 | Rutherford et al. | 29/261 |
| 4,056,972 | 11/1977 | Bromwich | 376/245 |
| 4,262,402 | 4/1981 | Cooper, Jr. et al. | 29/157 |
| 4,285,503 | 8/1981 | Calhoun et al. | 266/71 |
| 4,355,536 | 10/1982 | McShane et al. | 73/633 |
| 4,494,907 | 1/1985 | Coussau et al. | 376/249 |
| 4,508,063 | 4/1985 | Monne | 376/249 |
| 4,515,747 | 5/1985 | Creek et al. | 376/249 |

FOREIGN PATENT DOCUMENTS 2544123  10/1984  France ............... 376/245

OTHER PUBLICATIONS

U.S. Ser. No. 687,237 filed 12/28/84, D. R. Stoner et al.

Primary Examiner—Deborah L. Kyle
Assistant Examiner—Daniel Wasil

[57] ABSTRACT

A device for searching and retrieving objects on a tube sheet of a steam generator which includes a sled having a probe and a gripper thereon and connected to a flexible tube having control means therein for operating the probe and the gripper whereby the sled and flexible tube may be inserted through a handhole of the generator to an operating position on the tube sheet. Both the probe and the gripper may be angularly rotated to manipulate them between the tubes of the steam generator.

8 Claims, 5 Drawing Figures

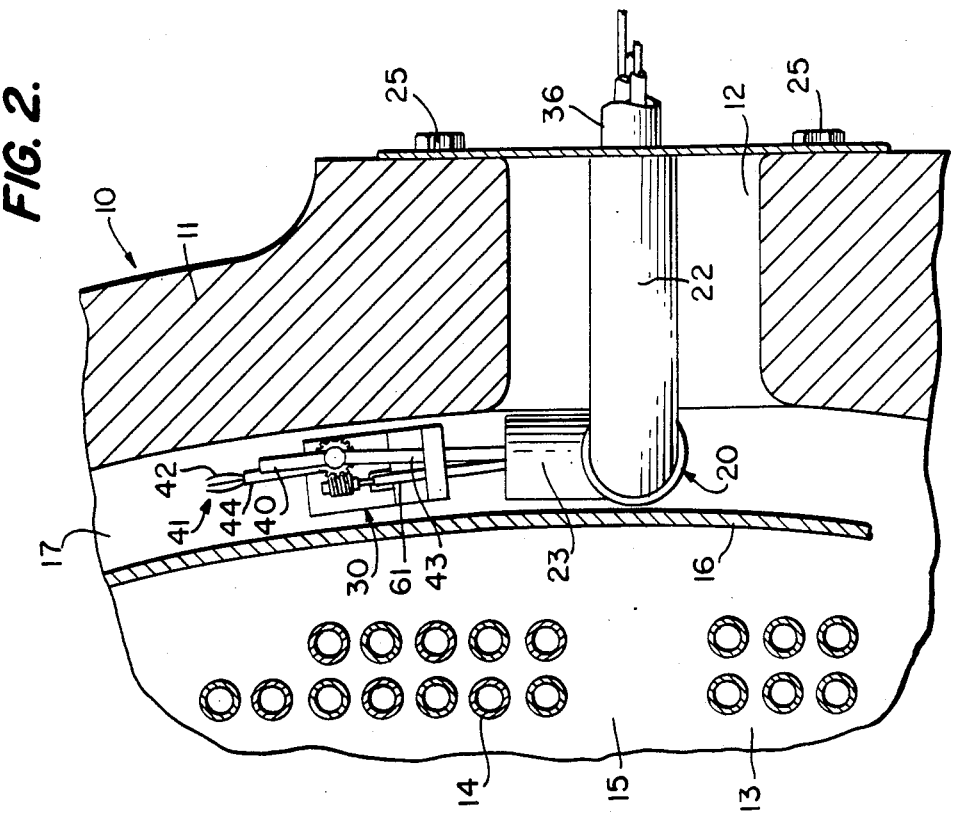
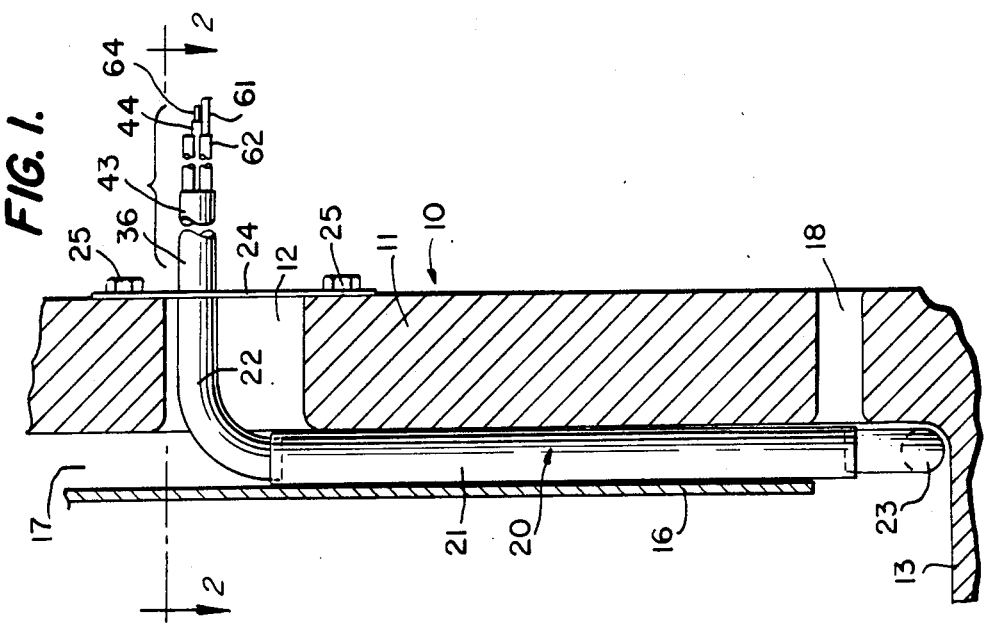

SEARCH AND RETRIEVAL DEVICE

BACKGROUND OF THE INVENTION

1. Field of the Invention

This invention relates to an apparatus for servicing a steam generator and, more particularly, to an apparatus for remotely inspecting and cleaning areas between the tubes on a tube sheet in a nuclear steam generator.

2. Description of the Prior Art

In a pressurized water nuclear powered electric generating system, the heat generated by the nuclear reactor is absorbed by a primary coolant that circulates through the reactor core and is utilized to generate steam in a steam generator. The steam generator typically is an upright cylindrical pressure vessel with hemispherical end sections. Such a generator typically comprises an outer vertically oriented shell, a horizontal plate called a tube sheet adjacent the lower end of the shell, a bundle of vertical U-shaped tubes supported by the tube sheet, and a wrapper barrel inside of the outer shell surrounding the tubes and extending from the upper portion of the shell downwardly to a predetermined point above the tube sheet. The wrapper barrel forms a narrow annulus inside the shell and generally extends down to a point six inches above the tube sheet. The outer cylindrical shell is provided with openings of limited size called handholes which are located 18 inches above the tube sheet. These handhole openings are covered during operation of the steam generator but may be opened when the generator is shut down to permit access to the area inside for maintenance purposes.

Occasionally, during maintenance inside the steam generator, objects such as bolts are dropped and have to be removed. Due to the limited space within the generator, the annulus between barrel wrapper and the shell generally is only two inches wide and the space beneath the bottom of the barrel wrapper is only six inches high. The bundle of tubes supported by the tube sheet also are very closely spaced together. Therefore, it is difficult to insert a device into the generator and to pick up objects between the pipes on the tube sheet.

While certain inspection and maintenance devices for steam generators are known, none of these devices are adapted to be able to search between the tubes of a steam generator and also retrieve loose objects in the narrow spaces between the tubes. For example, Creek et al. U.S. Pat. No. 4,515,747 discloses a remotely operated maintenance and inspection device which includes a wheeled transporter which is inserted through a handhole opening in the shell of a steam generator and positioned on the tube sheet between the tube bundle and the inner wall of the shell. A cable is then attached to each end of the transporter and extends around the bundle of tubes and out through the handhole opening whereby suitable power means may be utilized to move the transporter around the periphery of the tube bundle. A TV camera may be mounted on the transporter to inspect the tubes of the bundle. A sludge lance also may be mounted upon the transporter to break up and liquify deposits at the base of the tubes of the bundle. The Creek et al. device, however, does not provide any means for employing a device which can be manipulated through the bundle of tubes to pick up objects on the tube sheet. Moreover, since the transporter and its associated cable contact the tubes of the tube bundle, there is a risk that the tubes might be damaged during operation of the device.

Another type of prior art steam generator inspection device is disclosed in McShane et al. U.S. Pat. No. 4,355,536. This device basically comprises a probe mounted on the end of a ribbon-like probe carrier which is fed into the shell of a steam generator through the handhole opening and deflected by a carriage placed in alignment with a lane of tubes whereby the probe may measure the accumulation of sludge adjacent the bottom of the tubes. No means is provided on the device, however, for picking up and retrieving objects from the tube sheet.

Accordingly, a need still exists for a device capable of inspecting or searching the tube sheet in the areas between the vertical tubes and which also is adapted to pick up any loose objects between the tubes on the tube sheet.

SUMMARY OF THE INVENTION

Accordingly, it is an object of the present invention to provide a device for searching and retrieving objects on a tube sheet of a steam generator in the narrow spaces between the tubes and which readily may be inserted through the handhole opening of the shell of the steam generator and placed in operation on the tube sheet.

It is another object of the present invention to provide a device for searching and retrieving objects between the tubes on a tube sheet in a steam generator which is small enough in size to be placed in operating position inside the shell of the generator without dismantling any parts of the generator.

It is still another object of the present invention to provide a device for searching and retrieving objects on the tube sheet between the tubes of a steam generator without risk of damage to the tubes.

It is a further object of the present invention to provide a device for searching and retrieving objects on the tube sheet between the tubes of a steam generator which is of relatively simple construction and reliable in operation.

To achieve the foregoing and other objects of the present invention, and in accordance with the purpose of the invention, there is provided a device for searching and retrieving objects in a steam generator such as a nuclear steam generator wherein the generator includes an outer cylindrical shell, a horizontal tube sheet adjacent the lower end of the shell, a bundle of vertical tubes supported by the tube sheet, a wrapper barrel surrounding the tubes extending from the upper portion of the shell downwardly to a predetermined point above the tube sheet to form an annulus inside the shell and an opening called a handhole through the shell to the annulus. The search and retrieval device includes a sled adapted to be passed through the shell opening and down through the annulus to the surface of the tube sheet. A flexible tube is connected at one end to the sled and has its other end extending out through the shell opening. The tube is of sufficient length to be freely movable into and out of the shell opening to move the sled along the periphery of the tube sheet. A probe such as a TV camera or a fiberscope and a gripper are mounted on the sled for searching and retrieving objects. Adjusting means including a rotatable turret are mounted on the sled for changing the operating positions of the probe and the gripper so that they may be operated between the tubes on the tube sheet. Control means extend from outside the shell through the flexible tube for operating the probe, the gripper and the adjusting means.

These, together with other objects and advantages, which subsequently will be apparent, reside in the details of construction and operation of the invention as more fully hereinafter described and claimed, reference being made to the accompanying drawings forming a part hereof wherein like numerals refer to like parts throughout.

BRIEF DESCRIPTION OF THE DRAWINGS

FIG. 1 is an elevational cross-sectional view of a lower portion of the shell of a conventional nuclear steam generator showing the search and retrieval device of the present invention extending through the handhole opening down to the periphery of the tube sheet;

FIG. 2 is a cross-sectional view, taken along line 2—2 in FIG. 1, showing a top view of the search and retrieval device of the present invention in position at the periphery of the tube sheet;

DETAILED DESCRIPTION OF THE PREFERRED EMBODIMENTS

Figure 3:
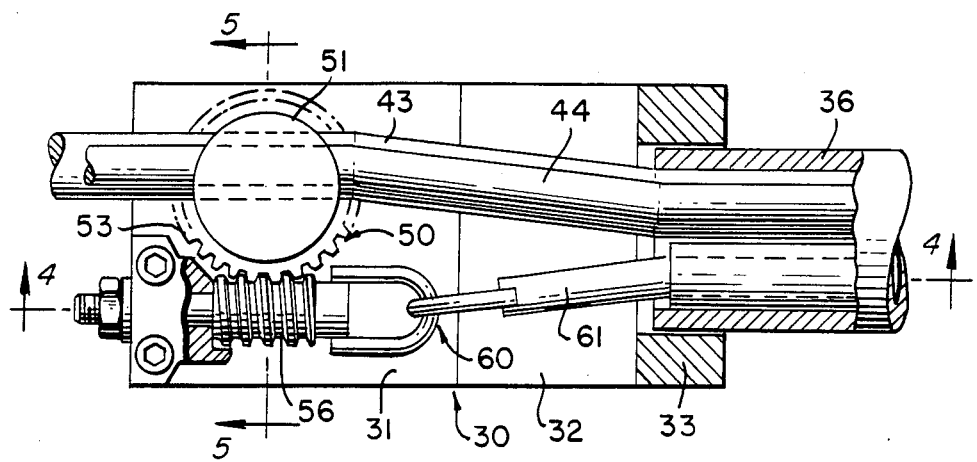
FIG. 3 is an enlarged top plan view, partially in cross-section, of the sled of the present invention illustrating the manner in which the controls for the probe and the gripper extend through the turret and the gear mechanism for rotating the turret.

Referring to the drawings, shown in FIGS. 1 and 2 is a portion of a conventional nuclear steam generator, generally indicated by the numeral 10, having an outer cylindrical shell 11 provided with an opening 12, generally referred to as a handhole, located approximately 18 inches from the tube sheet 13 adjacent the bottom of the shell. Generally the handhole is only six inches in diameter. As shown in FIG. 2, the steam generator further includes a plurality of closely spaced vertical tubes 14 supported by and extending upwardly from the tube sheet 13. The vertical tubes 14 are associated by pairs with a U-bend at the top (not shown) so as to straddle two sides of an aisle 15 extending centrally across the shell. The tubes 14 are surrounded by a wrapper barrel 16 spaced approximately two inches from the interior wall of the shell 11 to form an annulus 17, therewith. As shown in FIG. 1, the wrapper barrel 16, and consequently the annulus 17, extend downwardly to a point six inches above the tube sheet 13. As further shown in FIG. 1 an inspection hole 18 is provided below the handhole 12 in the shell and is located at a point just above the tube sheet 13.

As shown in FIGS. 1 and 2, the search and retrieval device of the present invention includes a guide tube, generally indicated by the numeral 20, having a straight main segment 21 and an upper segment 22 bent at a right angle to the main segment. The guide tube further includes a lower segment 23 also bent at a right angle to the main segment and extending in a direction rotated 90° from the direction of the upper segment 22. The lower segment 23 of the guide tube 20 rests on and is parallel to the surface of the tube sheet 13. The upper segment 22 and the lower segment 23 may be constructed as separate parts from the main segment 21 of the guide tube 20 to facilitate insertion of the guide tube into the steam generator. The guide tube is secured at its upper end to the shell 11 by means of a guide plate 24 fastened to the shell by suitable means such as bolts 25.

Figure 4:
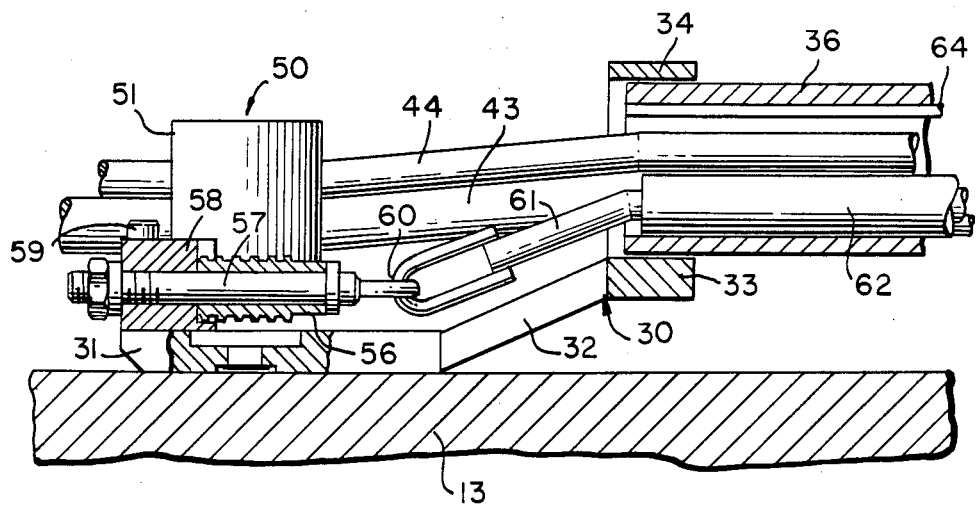
FIG. 4 is a cross-sectional view of the sled taken along line 4—4 of FIG. 3.

Referring particularly to FIGS. 3 and 4, the search and retrieval device also includes a sled, generally indicated by the numeral 30, which comprises a flat front plate 31, an intermediate plate 32 angled upwardly at approximately a 30° angle and a back plate 33 attached to the intermediate plate and positioned in a plane above but parallel to the plane of the front plate 31. Mounted on the back plate 33 is an upstanding bracket 34 for receiving and securely holding the end of a flexible steel tube 36 which extends from the back plate 33 of the sled 30 up through the guide tube 20 to the outside of the shell of the steam generator. Preferably, the flexible tube 36 has a diameter of one inch. While the flexible tube 36 preferably is constructed of steel, it also may be constructed of other suitable materials which are flexible enough to permit insertion through the guide tube 20 and the annulus 17 but yet is sufficiently rigid to permit pushing of the sled 30 around the periphery of the shell 11 on the tube sheet 13.

Figure 5:
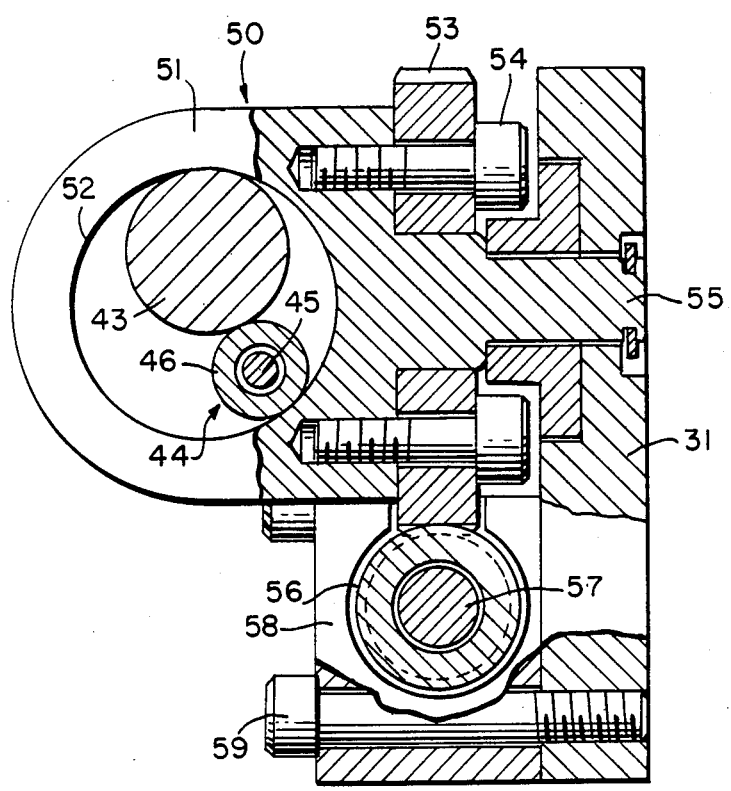
FIG. 5 is a cross-sectional view taken along line 5—5 of FIG. 3 illustrating the details of the turret.

An inspection probe 40 and a gripper 41 are associated with the sled 30 as most clearly shown in FIG. 2. The probe may be of any suitable type which permits inspection of the surface of the tube sheet 13. For example, the probe may comprise either a fiberscope or a miniature TV camera and preferably has a diameter of $\frac{3}{8}$ inch. The gripper may be of any type suitable for picking up small objects from the surface of the tube sheet. The gripper shown in FIG. 2 has a plurality of prongs 42 which may closed and opened to grasp and release objects. The probe 40 is connected to a flexible probe cable 43 which extends from the probe back through the flexible tube 36 to the outside of the steam generator. The gripper 41 is connected to a flexible gripper shaft 44 which also extends back through the flexible tube 22 to the outside of the steam generator. The gripper shaft 44 preferably has a diameter of $\frac{1}{4}$ inch. As shown in FIG. 5, the gripper shaft 44 consists of an inner shaft 45 slidably received within an outer shaft 46. The inner shaft 45 is connected to the end of gripper 41 whereby when the inner shaft is pushed forwardly the gripper prongs 42 are opened and when the inner shaft 45 is pulled backwardly the prongs 42 close to grasp an object. The probe cable 43 and the gripper shaft 44 constitute control means for the probe 40 and the gripper 41.

Adjusting means, generally indicated by the numeral 50, are mounted on the sled 30 for changing the operating positions and direction of the probe and the gripper. The adjusting means 50 is comprised of a rotatable turret 51 having a circular passageway 52 extending through the upper portion thereof and a worm wheel 53 fixedly attached to the lower portion thereof by any suitable means such as bolts 54 as shown in FIG. 5. The turret 51 is rotatably attached to the front plate 31 of the sled by shaft 55. A worm gear 56 is rotatably mounted on shaft 57 secured by bracket 58 to the front plate 31 of the sled 30. Bracket 58 is mounted to front plate 31 by any suitable means such as bolts 59. The worm gear 56 meshes with worm wheel 53 whereby rotation of the worm gear causes the worm wheel 53 and consequently turret 51 to rotate. The probe cable 43 and the gripper shaft 44 freely pass through the circular passageway 52 of the turret 51 so that they may slide therethrough.

Attached to the end of the shaft 57 on which worm gear 56 is mounted is a universal mechanism 60 which in turn is attached to the end of an actuator cable 61 rotatably received within an outer cable 62 which extends through a flexible tube 36 to the outside of the steam generator as shown in FIGS. 4 and 5. Actuator cable 61 rotates within outer cable 62 in a manner similar to a speedometer cable. Rotation of cable 61 causes the worm gear to also rotate or turn.

An emergency pull wire 64 also extends through the flexible tube 36 and is welded to the flexible tube at each end thereof. The emergency pull wire 64 extends outwardly from the outer end of the flexible tube whereby if the flexible tube 36 becomes stuck, the emergency pull wire will prevent unraveling of the flexible tube 36 while the tube is being pulled out.

In operation of the search and retrieval device of the present invention, the outer end of the flexible tube 36 is initially inserted through the guide tube 20 and out through the end of the upper segment 22 thereof. The sled 30 and the guide tube 20 having the flexible tube 36 passing therethrough are then inserted through the handhole 12 until the sled 30 is positioned on the surface of the tube sheet 13 and the lower segment 23 of the guide tube 20 is parallel to the surface of the tube sheet. An operator of the device may view the guide tube 20 through the inspection hole 18 to ensure that the guide tube is positioned correctly.

Once the sled and the associated components mounted thereon are in position on the periphery of the tube sheet, the probe may be activated to search for any loose objects on the surface of the tube sheet. The sled is moved along the periphery of the tube sheet by pushing the flexible tube through the guide tube 20. Pushing or pulling on the flexible tube 36 causes the sled to slide over the surface of the tube sheet. The sled may be stopped at any point and the turret 51 rotated by turning or rotating actuator cable 61 in order to turn the probe and the gripper inwardly to face the rows of the tubes 14. Both the probe cable 40 and the gripper shaft 44 then may be pushed by any suitable means outside of the shell of the steam generator whereby the probe cable 43 and the gripper shaft 44 slide through the circular passageway 52 of the turret to extend the probe 40 and the gripper 41 to a position among the tubes. When an object to be removed is located by use of the probe, the gripper shaft is then pushed until the gripper comes in contact with the object whereupon the inner shaft 45 of the gripper shaft 44 is pulled to close the prongs 42 and grasp the object. The entire sled assembly is then removed from the steam generator and the object released from the gripper. The above-described operation is then continually repeated until the entire tube sheet has been inspected and cleaned.

The flexible tube 36 may be pushed through the guide tube 20 either manually or by automatic means (not shown) located outside the shell of the generator. In addition, the rotation of the actuator cable 61 and the pushing and pulling of the probe cable 43 and the gripper shaft 44 may also be done either manually or by suitable automatic means (not shown) located outside the shell of the generator.

It is apparent from the foregoing that many advantageous features are provided by the present invention over the prior art. A device for searching and retrieving objects in the small spaces between the tubes on a tube sheet of a nuclear steam generator is disclosed which is relatively simple and economical in construction and which may be readily maneuvered into and through the small spaces present in a steam generator to retrieve objects which have been dropped on the tube sheet and have to be removed. The present invention permits such removal without having to dismantle any part of the steam generator to provide access to the interior portions thereof.

Numerous alterations and modifications of the structure herein disclosed will suggest themselves to those skilled in the art. It is to be understood, however, that the present disclosure relates to the preferred embodiments of the invention which is for purposes of illustration only and is not to be construed as a limitation of the invention. All such modifications which do not depart from the spirit of the invention are intended to be included within the scope of the appended claims.

We claim as our invention:

1. A device for searching and retrieving objects in a steam generator having an outer cylindrical shell, a horizontal tube sheet adjacent the lower end of said shell, a bundle of vertical tubes supported by said tube sheet, a wrapper barrel surrounding said tubes extending from the upper portion of said shell downwardly to a predetermined point above said tube sheet to form an annulus inside said shell and an opening through said shell to said annulus, said device comprising:
   (a) a sled adapted to be passed through said shell opening and down said annulus to said tube sheet;
   (b) a flexible tube connected at one end to said sled and having its other end extending out through said shell opening, said flexible tube being of sufficient length to be freely movable into and out of said shell opening to move said sled along said tube sheet;
   (c) a probe and a gripper associated with said sled for searching and retrieving objects;
   (d) adjusting means on said sled for changing the operating positions of said probe and said gripper;
   (e) control means outside of said shell extending through said flexible tube for operating said probe, said gripper and said adjusting means;
   (f) said control means comprising a probe cable attached to said probe, a gripper shaft attached to said gripper and a rotatable actuator cable connected to said adjusting means, said probe cable and said gripper shaft being slidably received within said flexible tube; and
   (g) said adjusting means comprising a rotatable turret mounted on said sled and said probe cable and said gripper shaft being slidably connected to said turret.

2. The device of claim 1 which includes a pull wire attached to said flexible tube.

3. The device of claim 1 which includes a guide tube secured to said shell at said shell opening and extending down through said annulus to said tube sheet to guide said sled and said flexible tube into operating position on said tube sheet.

4. The device of claim 3, wherein the lower end of said guide tube includes a segment parallel to said tube sheet.

5. The device of claim 3 which includes a guide plate for securing said guide tube to said shell.

6. In a nuclear reactor system having a steam generator which includes an outer cylindrical shell, a horizontal tube sheet adjacent the lower end of said shell, a bundle of vertical tubes supported by said tube sheet, a wrapper barrel surrounding said tubes extending from the upper portion of said shell downwardly to a predetermined point above said tube sheet to form an annulus inside said shell and an opening through said shell to said annulus, a device for searching and retrieving objects comprising:
- a. a sled adapted to be passed through said shell opening and down through said annulus to said tube sheet;
- b. a flexible tube connected at one end to said sled and having its other end extending out through said shell opening, said flexible tube being of sufficient length to be freely movable into and out of said shell opening to move said sled along said tube sheet;
- c. a guide tube secured to said shell and extending from said shell opening down through said annulus to said tube sheet to guide said sled and said flexible tube into operating position on said tube sheet;
- d. a probe and a gripper mounted on said sled for searching and retrieving objects;
- e. a probe cable attached to said probe and a gripper shaft attached to said gripper extending through said flexible tube to operate said probe and said gripper;
- f. a rotatable turret mounted on said sled and slidably connected to said probe cable and said gripper shaft for controlling the operating positions of said probe and said gripper; and
- g. a rotatable actuator cable extending through said flexible tube and operatively connected to said turret to rotate said turret.

7. The device of claim 8, wherein the lower end of said guide tube includes a segment parallel to said tube sheet.

8. The device of claim 8 which includes a guide plate for securing said guide tube to said shell.

* * * * *